United States Patent [19]

Bova

[11] 4,290,837

[45] Sep. 22, 1981

[54] METHOD AND APPARATUS FOR MAKING UNEXPANDED HONEYCOMB MATERIAL

[76] Inventor: Joseph D. Bova, 2104 Harford Rd., Fallston, Md. 21047

[21] Appl. No.: 108,009

[22] Filed: Dec. 28, 1979

[51] Int. Cl.$^3$ ........................ B32B 31/00; B32B 3/12

[52] U.S. Cl. ...................................... 156/256; 83/153; 83/154; 101/224; 101/226; 156/197; 156/269; 156/277; 156/291; 156/324; 156/384; 156/517; 156/541; 156/548; 156/558; 427/207.1; 427/208; 427/208.2; 427/286; 428/116; 428/195

[58] Field of Search ................ 107/224, 226; 156/197, 156/291, 277, 269, 384, 324, 256, 517, 541, 548, 558; 428/116, 198, 195; 427/286, 207.1, 208, 208.2; 83/154, 153

[56] References Cited

U.S. PATENT DOCUMENTS

| | | | |
|---|---|---|---|
| 2,636,540 | 4/1953 | Lincoln | 428/116 X |
| 2,649,131 | 8/1953 | Lincoln | 156/197 |
| 2,734,843 | 2/1956 | Steele | 156/197 |
| 2,983,640 | 5/1961 | Knoll et al. | 156/197 |
| 2,993,525 | 7/1961 | Lincoln | 156/197 X |
| 3,114,666 | 12/1963 | Johnson | 156/197 |
| 3,242,024 | 3/1966 | Bova et al. | 156/197 |
| 3,477,893 | 11/1969 | Brazener et al. | 156/197 |
| 3,519,510 | 7/1970 | Ardolino et al. | 156/197 |
| 3,563,174 | 2/1971 | Anderson et al. | 101/181 X |
| 3,675,522 | 7/1972 | Hull | 83/14 |
| 3,713,954 | 1/1973 | Clark et al. | 156/548 |
| 3,899,946 | 8/1975 | Niepmann | 101/226 X |

*Primary Examiner*—Robert A. Dawson

[57] ABSTRACT

A method of forming a stack of unexpanded honeycomb core sheets from a continous web of which alternate sheets in the stack have linearly spaced and transversely extending lines of adhesive on one side spaced equally between similar adhesive lines on the others of the sheets when evenly stacked, such method including applying linearly spaced and transversely extending lines of adhesive on one face of the web, cutting the web parallel to the adhesive lines with one cut being made along the linear center of a line of adhesive and the next cut being made along the linear center of the space between the adhesive lines, and then stacking the cut sheets in even edge alignment resulting in the lines of adhesive being linearly staggered on one sheet with respect to those on the adjacent sheet.

The preferred apparatus for performing the method includes a gravure roll having an odd number of transversely extending gravure lines equally spaced around its circumference, a cutting roll downstream from the gravure roll having a cutting circumference equal to the length of the sheets to be cut with such circumference also being equal to a given number plus one-half the circumference of the gravure roll, the gravure roll and cutting roll being linked together to maintain the cut-to-adhesive line relationship, and a vacuum pulling apparatus between the gravure roll and cutting roll to keep the web taut so that cutting occurs in the desired location.

20 Claims, 6 Drawing Figures

CUT 1
CUT 2
CUT 3
SPACE
LINE

METHOD AND APPARATUS FOR MAKING UNEXPANDED HONEYCOMB MATERIAL

BACKGROUND OF THE INVENTION

The invention relates generally to the production of unexpanded honeycomb core material and more particularly to a method and apparatus for applying transverse lines of adhesive to a moving web and cutting the web into sheets with one cut being along a line of adhesive and the next being along a space between the lines of adhesive.

DESCRIPTION OF THE PRIOR ART

Unexpanded honeycomb core material has been produced in many different ways including the application of transverse lines of adhesive to both sides of the web material, such as shown in Ardolino et al U.S. Pat. No. 3,519,510, to one side of the web material, such as shown in Knoil et al U.S. Pat. No. 2,983,640, and the application of longitudinally but angularly, extending lines of adhesive to one side of the web material, such as shown in Johnson U.S. Pat. No. 3,114,666. With respect to the last mentioned patent, a disadvantage is inherent in its arrangement in that the length of the expanded product is limited to the width of the machine used to make the unexpanded core block because the block must be cut transverse to web travel to produce the honeycomb panel thickness desired. With respect to the first mentioned patent, even though the core block may be cut longitudinally, special pins are required to achieve staggered adhesive line registration when the cut sheets are stacked. With regard to the Knoll et al patent, a formula is given for calculating the distance between the lines of adhesive but no teaching appears as to how this may be applied to the geometry of the gravure roll and cutting roll to achieve the desired result.

Furthermore, the prior art does not disclose positive means operative to maintain registration of the lines of adhesive as between the gravure roll and the cutting roll. Other patents of interest relating to the production of unexpanded honeycomb core material are U.S. Pat. Nos. 3,675,522; 3,563,174; 3,713,954; 2,636,540; 2,649,131; 2,993,525; 2,734,843; and 3,477,893. Accordingly, a general object of this invention is to provide an improved method and apparatus for producing unexpanded honeycomb core material. More particularly, an object of the invention is to provide a method and apparatus for cutting sheets from the web material, with transverse lines of adhesive printed transversely on one side thereof with alternate cuts occurring along the linear center of the spaces between the lines of adhesive. Still another object is to provide a means for maintaining the web taut between the adhesive line printing means and the cutting means so that the cuts occur in the desired location. A further object of the invention is to provide an adjustable cutting means to permit cutting of sheets of different lengths from the web material.

SUMMARY OF THE INVENTION

The above and further objects are generally accomplished by applying linearly spaced and transversely extending lines of adhesive on one face of a continuous web by use of a gravure roll engraved so as to apply such adhesive lines to the web; thereafter cutting the web into discrete sheets by use of a cutting roll whose effective cutting circumference is proportioned to the circumference of the gravure roll such that a first cut is made along the linear center of a line of adhesive on the web and a succeeding cut is made along the linear center of the space between the adhesive lines so that, when the sheets are evenly stacked, the lines of adhesive on alternate sheets are linearly offset or staggered with respect to the adhesive lines on the others of the sheets; applying a gripping means to the web to maintain registration of the adhesive lines with respect to cutting thereof by using a gripping means to hold the web taut between the gravure roll and the cutting roll; and then stacking the sheets evenly to achieve the desired offset of the adhesive lines by the use of a hopper to receive the cut sheets. The above and further objects and novel features of the invention will be readily understood from the following detailed description when read in connection with the accompanying drawings. It should be understood however, that the drawings are not intended as a definition of the invention but are for the purpose of illustration only.

BRIEF DESCRIPTION OF THE DRAWINGS

In the drawings where like parts are marked alike.

DESCRIPTION OF THE PREFERRED EMBODIMENT

Figures 1, 2, 3, 4, 5, 6:
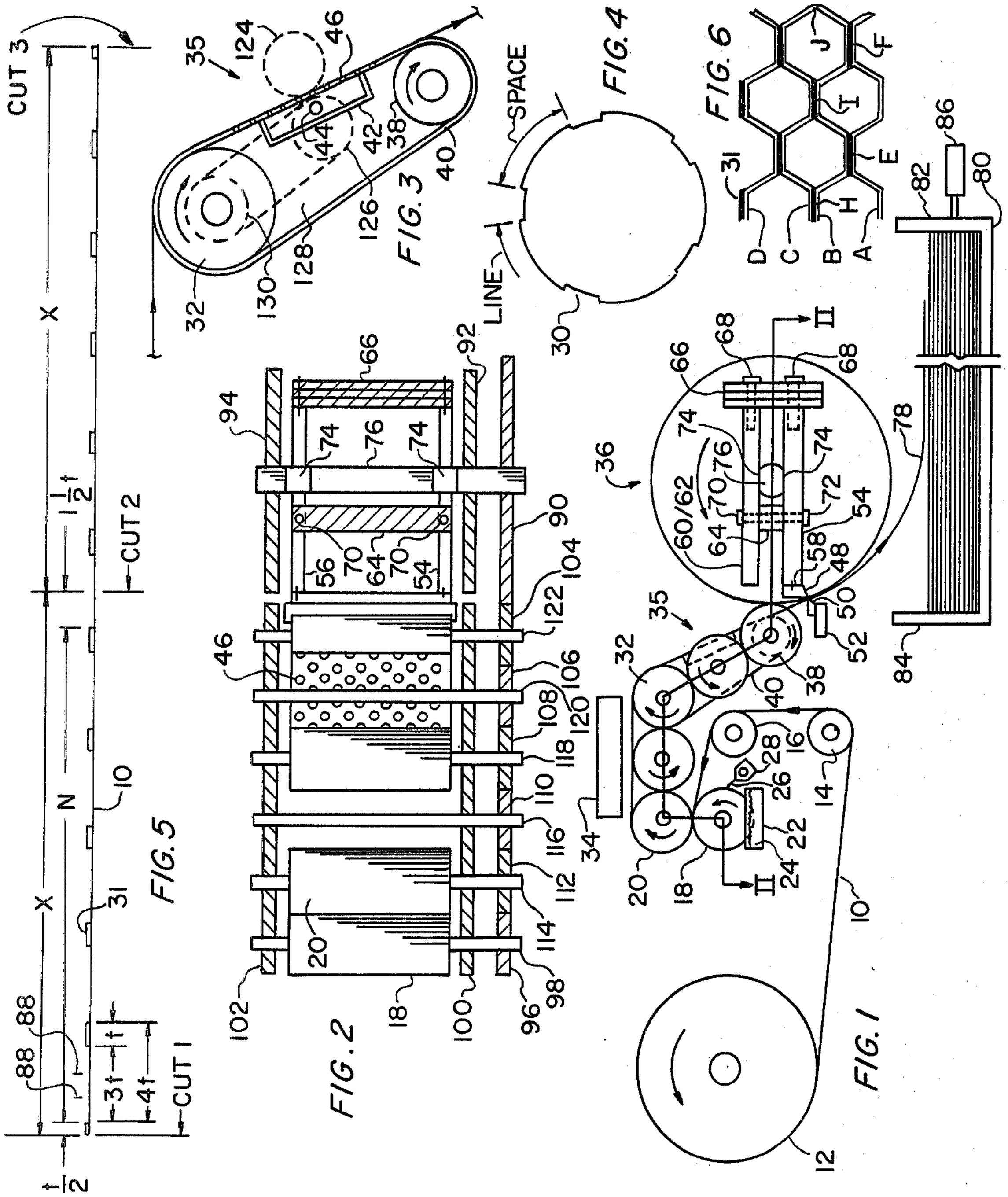
FIG. 1 is a schematic illustration in side elevation of the invention showing the path of travel of the web from a supply roll to a printing station where the adhesive lines are printed on one side of the web and then past a heating apparatus for drying the adhesive and onto a gripping apparatus for maintaining the web taut and then past a cutting roll which cuts the web into discrete sheets and then onto another gripping apparatus and into a hopper where the sheets are evenly stacked.
FIG. 2 is a cross-sectional view of the apparatus of FIG. 1 taken along the lines II—II.
FIG. 3 is an enlarged view of the preferred gripping apparatus shown in FIG. 1 and also showing an alternate arrangement in dotted lines.
FIG. 4 is a schematically illustrated end view of the gravure roll showing the relationship of the gravure lines thereon to the spaces between the gravure lines.
FIG. 5 is a graphic illustration of the web showing where the cuts are made to form discrete sheets to provide staggered lines of adhesive on alternate sheets when evenly stacked and the relationship of the width of the lines of adhesive to the width of the spaces therebetween.
FIG. 6 is a top view of a portion of expanded honeycomb core material produced in accordance with the invention.

The preferred apparatus for practicing the invention is generally illustrated in FIG. 1 and FIG. 2. Referring to FIG. 1 a web of material 10, such as aluminum or plastic, unwinds in the direction of the arrows on web 10 from a suitably supported supply roll 12 and passes around a pair of idler or guide rolls 14 and 16. From roll 16, the web 10 passes between a gravure roll 18 and an impression roll 20. The gravure roll 18 is arranged for partial immersion in a pan 22 of liquid adhesive 24, such adhesive adhering to the periphery of the roll 18. A doctor blade 26, suitably mounted in a holder 28 so as to urge the blade 26 against the roll 18, wipes the adhesive from the roll 18 except in the engraved portions 30 comprise a number (only five shown) of lines of selected width (to be further explained) extending parallel to the rotational axis of the roll 18. Such engraved portions 30 consist of a large number of cells etched into the metal surface of the roll 18 and serve to hold adhesive therein which cannot be wiped off by the doctor blade 26 as well understood by those skilled in the art. Thus, as the web 10 passes between rolls 18 and 20, the adhesive is transferred to the side of the web 10 in contact with roll 18 and appears thereon as a series of linearly spaced lines of adhesive 31 extending across the width of the web 10 as graphically illustrated in FIG. 5. The impression roll 20 is preferably rubber covered and arranged to exert a slight pressure against the web 10 to assure a positive transfer of the adhesive to the web 10. The web 10 reverses direction, with respect to its passage between rolls 18 and 20, as it passes around roll 20 and is advanced to a conveyor roll 32 spaced from roll 20. As the web 10 advances from roll 20 to roll 32, it passes beneath a heating apparatus 34 which dries the line of adhesive 31 which, at this point, are on the top side of the web 10. The adhesive 24 may be any of several types. All can be dried by heat but the preferred type, for purposes of this invention, is a modified epoxy resin, or so-called dried line adhesive, which can be heat set and polymerized similar to that described in particular in U.S. Pat. No. 2,734,843. The heating apparatus 34 preferably comprises one or more quartz lamps supported in a suitable reflector to direct heat towards the web 10. If desired, infra-red lamps may also be used. Regardless, the heat cures the adhesive to a relatively dry nontacky stage so that it does not smear as the sheets subsequently cut from the web come into contact with one another. From the conveyor roll 32, the web 10 passes over a gripping apparatus denoted by numeral 35 and towards a cutting roll assembly generally denoted by numeral 36. Gripping apparatus 35 preferably comprises conveyor roll 32 and conveyor roll 38 around which passes an endless perforated conveyor belt 40 as best shown in FIG. 3. A vacuum box 42 is mounted below the upper flight of the belt 40. A suitable vacuum pump (not shown) is connected to the vacuum box 42 from an opening 44 in the end of the box. Thus, vacuum is applied through the perforations 46 in the portion of the belt 40 on top of vacuum box 42 to the underside of web 10 thereby holding the web against the belt 40. In this manner, the web 10 is held taut against the belt 40 and will advance only at the speed that the belt is moving. The roll 38 is preferably smaller in diameter than roll 32 to result in the geometric arrangement shown in FIG. 1, whereby the web 10 advances substantially tangent to the cutting roll assembly 36. The cutting roll assembly 36 includes a shear type cutting blade 48 which, as it rotates, acts against a fixed shear type anvil blade 50 suitably mounted to a horizontally adjustable base plate 52 which can be adjusted towards rotatable blade 48 to provide a clean sheer cut across the web 10. Rotatable sheer blade 48 is secured to transversely spaced right and left lower support arms 54 and 56 (FIG. 2) such as by screws denoted by the lines numbered 58. Arms 54 and 56 are secured to similar right and left upper support arms 60 and 62, being spaced therefrom by a crossbar 64 and a cross counterweight bar 66. Screws 68 passing through bar 66 and threaded into the arms 54, 56, 60 and 62 secure the bar 66 to the arms. Bolts 70 pass through the upper arms 60 and 62, through the cross bar 64, and through the lower arms 54 and 56 with nuts 72 threaded thereon. The arms 54, 56, 60 and 62 straddle diametrically opposed flat surfaces 74 cut in a cross shaft 76 as shown in FIGS. 1 and 2. The thickness of cross bar 64 is slightly less than the thickness of shaft 76 between the flats 74. Thus as bolts 70 and nuts 72 are tightened, the arms 54, 56, 60 and 62 are clamped tightly to shaft 76 and rotate therewith, carrying the cutting blade 48 therewith as shaft 76 rotates. This arrangement permits the arms 54, 56, 60, and 62 to be moved rotative to the shaft 76 and thereby change the effective cutting circumference of blade 48, the reason for which will be subsequently explained. The counterweight bar may comprise a number of separate plates as shown in FIGS. 1 and 2 so that its weight may be changed depending on the position of the blade support arms to counter balance the roll assembly 36 during rotation. As the web 10 is advanced by the gripping assembly 35 past the cutting roll assembly 36, it is cut into discrete sheets 78 by coaction of the cutting blades 48 and 50, the length of the sheets 78 being equal to the effective cutting circumference of cutting roll 36. This circumference is of course, determined by the distance that the cutting edge of blade 48 is from the center of rotation of shaft 76. As the sheets 78 are severed from web 10, they fall forward and downward by virtue of their velocity and gravity into a hopper assembly 80, each sheet 78 coming to rest against a downstream stop 82 of the hopper assembly 80. The arrow 84 shows the direction of fall of the trailing portion of the sheet 78 into the hopper 80 where the trailing edge may come to rest against a stop 84. To assure even stacking of the sheets 78 in the hopper 80, it is helpful to vibrate the hopper. This may be accomplished by connecting a conventional electric or mechanical vibrator to the hopper such as a vibrator 86 connected to stop 82 as illustrated in FIG. 1. In this manner, the sheets 78 settle evenly in the hopper 80 between the stops 82 and 84.

As will be understood by those skilled in the art, the lines of adhesive 31 must be staggered on alternate sheets 78 with respect to the lines of adhesive 31 on the others of the sheets 78 lying between the alternate sheets as schematically illustrated by the sheets 78 in the hopper 80 in FIG. 1. Thus, after the adhesive is cured by additional heat and pressure applied to the stack, the sheets 78 will be bonded together so that a lengthwise (in the ribbon direction) section of desired width cut from the stack can be stretched to form expanded honeycomb as illustrated in FIG. 6, the expanded honeycomb comprises a multiplicity of adjoining six-sided cells with one of the six-sides bonded to a sixth side of the adjacent cell. It can also be seen that the portion of expanded honeycomb shown in FIG. 6 is made up of four sheets A, B, C, and D with a line of adhesive 31 being initially applied to the flat sheets 78 at spaced intervals on the top of succeeding sheets after final curing, the sheets 78 are bonded together by the adhesive lines 31. Thus, adhesive lines E, F, and G are initially applied to the top of sheet A and adhesive lines H, I, and J are applied to the top of sheet B and so for the succeeding sheets. It will also be apparent from FIG. 6 that each half-cell, for example, sheet B, includes one side with adhesive H initially applied thereto and three sides without adhesive initially applied thereto. Before expansion into the honeycomb configuration of FIG. 6, the flat sheet will appear as shown in FIG. 5. In FIG. 5, it can be seen that the width of one side of a cell must be covered with adhesive and the remaining three sides not covered with adhesive. Thus, the total distance from cell side to cell side will equal 4 t, that is four times the width of the line of adhesive 31 represented by width t;

the remaining three sides being three times the width of the adhesive line t for a total of 3 t. These cell sides are illustrated on the left of FIG. 5 by the lines 88. Thus, the one cell side t with the adhesive thereon plus the three sides without adhesive equals 4 t which is the repeat length. It will also be apparent that if the first cut in the web is made through the linear center of a line of adhesive 31 on web 10, then the second cut must be made through the linear center of the space between the lines of adhesive which is one and one-half t and the third cut must be made again through a line of adhesive 31 so that when the sheets are stacked evenly one on top of the other, the lines of adhesive 31 will be staggered as shown in the hopper 80 of FIG. 1. From the following, it can be seen that, by using the formula $X=T(4n+2)$ wherein X equals the sheet length in inches, T equals the width of the adhesive line in inches, and N equals the number of honeycomb side bonds desired for the sheet length, the lines of adhesive on succeeding sheets will be equally staggered relative to one another when the sheets are placed in even edge alignment. FIG. 5 illustrates where the first, second, and third cuts are made in the web to achieve this result. To cut the web in the foregoing manner, and assuming that the desired length of each sheet 78 is to be 63 inches long, then the effective cutting circumference of cutting roll 36 will be 63 inches. To provide the correct number of adhesive lines on the sheet so that the first cut will be along the linear center of a line of adhesive 31 and the second cut will be along the linear center between two lines of adhesive, then the gravure roll must be proportioned as shown schematically in FIG. 4 with the centerline of the space between the adhesive lines being exactly opposite to the centerline of a line of adhesive; thus, FIG. 4 denotes the gravure lines as a "line" and the spaces between the gravure lines as a "space." Thus it can be seen that there will always be an odd number of lines and spaces on the surface of the gravure roll 18. It will also be apparent that the gravure roll 18 must make a given number plus one-half revolutions for each revolution of the cutting roll 36. Therefore, if the circumference of the gravure roll 18 is 14 inches, then the given number will be 4 revolutions plus one-half revolution which equals 63 inches, the circumference of the cutting roll 36. To make the gravure roll rotate $4\frac{1}{2}$ times for each revolution of the cutting roll 36, a conventional spur-tooth gear 90 is secured to the cutting roll cross-shaft 76 for rotation therewith as shown in FIG. 2. The pitch diameter of gear 90 is such that its pitch circle is 63 inches in circumference, that is, the same as the effective cutting circumference of cutting of cutting roll 36. The cross-shaft 76 is supported for rotation in a pair of side frames 92 and 94. A spur-tooth gear 96 is secured for rotation between a pair of side frames 100 and 102. The pitch circle of gear 96 is the same as the circumference of gravure roll 18, i.e., 14 inches. Cutting roll gear 90, which may be driven by rotation of an electric motor (not shown) suitably connected to one end of cross-shaft 76, is connected to the gravure roll gear 96 by a series of intermediate gears 104, 106, 108, 110, and 112 as shown in FIG. 2. Although the intermediate gears may be of any reasonable size, since the ratio between gears 90 and 96 remains the same, it is convenient to have these gears all the same size as gear 96 since they can be used to rotate the impression roll 20 and conveyor roll 32 at the same surface speed as gravure roll 18 so that the web 10 advances at a uniform rate. A cross-shaft 114 supports gear 112 for rotation with gears 96 and 110 and also supports the impression roll 20 for rotation between the side frames 100 and 102. Another cross-shaft 116 supports gear 110 for rotation between gears 112 and 108, such shaft also extending between side frames 100 and 102; however, this cross-shaft need not support another roll as shown in FIG. 2. A cross-shaft 118 supports gear 108 for rotation between gears 110 and 106 and also supports the conveyor roll 32 for rotation between side frames 100 and 102. Still another cross-shaft 120 supports gear 106 for rotation between gears 108 and 104; similarly, cross-shaft 120 extends between the frames 100 and 102 but need not support another roll thereon since the web 10, at this point, is supported by the bolt 40. Finally a cross-shaft 122 supports gear 104 for rotation between gears 106 and 90, thereby completing the gear train between the cutting gear 90 and gravure roll gear 96. Shaft 122 also supports the lower conveyor roll 38 around which the belt 40 passes. Although shafts 116 and 120 are shown extending through the side frames 100 and 102, it should be understood that they may comprise stub shafts bolted to frame 100 with suitable bearings between the gears 110 and 106 and the stub shafts to permit the gears to rotate freely thereon. From the foregoing, it can be seen that the desired ratio between gravure roll gear 96 and cutting roll gear 90 is established and that the arrangement of the remaining gears provides the proper rotation of the rolls touching the web 10 to advance it from the gravure roll 18 to the cutting roll assembly 36. FIG. 1 is a hybrid view representing both the rolls and gears previously identified to show the over-all relationship between the various elements of the apparatus. With the foregoing arrangement, it is relatively simple to cut a sheet longer than the 63 inch long sheet mentioned. For example, the cutting roll circumference can be changed by loosening the bolts 70 and sliding the bars 54/56 and 60/62 to the left as viewed in FIG. 1, to provide an effective cutting circumference that is equal to a given number, e.g. five, plus one-half revolutions of the gravure roll 18; thus the cutting circumference in this example would be 77 inches. This arrangement still results in the second cut being made half way between a pair of adjacent adhesive lines as previously described so that the adhesive lines are staggered on succeeding sheets. Of course, it will at the same time be necessary to substitute another gear having a pitch circumference of 77 inches to maintain the relationship between the cutting roll gear and the gravure roll gear 96. It should also be understood that the first cut need not be through the linear center of a line of adhesive 31; the web can be started so that the first cut just misses the line of adhesive and therefore the second cut will be spaced from the linear center between adjacent lines of adhesive by a corresponding amount. This will still result in the adhesive lines on succeeding sheets being staggered relative to one another as desired. This arrangement is deemed equivalent to making the first cut through the linear center of a line of adhesive as set forth in the appended claims. Rather than using the preferred vacuum belt arrangement shown in detail in FIG. 3, the gripping means may comprise a pair of pinch rolls 124 and 126, as shown by the dotted lines in FIG. 3, to grip the web 10 for advancement to the cutting roll assembly 36. The roll 126 may be chain driven by a chain 128, driven by a sprocket 130 secured for rotation to the shaft 118 of conveyor roll 32. This arrangement provides the needed direction of rotation for roll 126. Other means may be devised to accomplish the method of this invention provided such apparatus includes means for applying linearly spaced and transversely extending lines of adhesive to one face of the web 10, means for cutting the web 10 parallel to the lines of adhesive with the first cut to be made along the linear center of a line of adhesive (or adjacent thereto) and making the next succeeding cut along the linear center of the space between adjacent lines of adhesive, means for gripping the web 10 for advancement in a controlled manner to a cutting means to maintain registration between the adhesive lines and the cutting means, and a means for stacking the sheets cut from the web in even edge alignment. Any such method should also include the application of heat to the web to dry the adhesive lines thereon, to their desired non-tacky state and, in addition, preferably should include means for vibrating a hopper means used to collect the cut sheets to aid in stacking them in even edge alignment.

Thus having described the invention in its best embodiment and mode of operation, that which is desired to be claimed by Letters Patent is:

1. A method of forming a stack of unexpanded honeycomb core sheets from a continuous web of sheet material of which alternate ones of said sheets in said stack have linearly spaced and transversely extending lines of adhesive on one side thereof spaced equally between similar adhesive lines on the others of said sheets when stacked in even edge alignment, comprising the steps of: applying linearly spaced and transversely extending lines of adhesive to at least one face of said web by contacting said web with a printing roll having spaced lines of adhesive thereon; cutting said web parallel to said lines of adhesive and each succeeding cut being made a set distance from each other; said cutting being made by a rotary cutting roll, having a transversely extending cutting blade thereon, rotating once for a given number plus one-half revolutions of said printing roll for cutting said web along a linear center of a line of said adhesive on said web and on a succeeding rotation of said cutting roll, cutting said web between linearly spaced lines of adhesive on said web.

2. The method of claim 1 wherein the step of applying a gripping means to said web comprises applying vacuum to said web for advancing said web at a controlled velocity.

3. The method of claim 1 wherein the step of applying a gripping means to said web comprises passing said web between a pair of pinch rolls for advancing said web at a controlled velocity.

4. The method of claim 1 wherein said printing roll is a gravure roll, having an odd number of transversely extending gravure lines equally spaced around the circumference of said roll; impressing against one side of said continuous web for applying transversely extending and linearly spaced lines of adhesive to said web.

5. The method of claim 4 further including the step of: applying heat to said web following the application of said adhesive lines thereon sufficient to dry said adhesive prior to cutting said web.

6. The method of claim 5 further including the step of: stacking succeeding ones of said sheets cut by said cutting roll in even edge alignment to place said lines of adhesive on alternate ones of said sheets accurately between said lines of adhesive on the others of said sheets.

7. The method of claim 6 further including the steps of: vibrating a hopper means receiving succeeding ones of said sheets cut by said cutting roll to aid in stacking said sheets in even edge alignment in said hopper means.

8. Apparatus for making a stack of unexpanded honeycomb core sheets from a continuous web comprising: a printing means including a gravure roll having an odd number of gravure lines spaced equally around the circumference of said roll for applying transversely extending lines of adhesive at linearly spaced intervals along the length of said web on one side thereof; a cutting means downstream from said printing means including a cutting roll with a transversely extending cutting blade thereon, said cutting roll having a cutting circumference equal to the length of the sheets to be cut from said web, such circumference also being equal to a given number plus one-half of the circumference of said gravure roll; a web pulling means between said printing means and said cutting means for pulling said web past such gravure roll and controlling the advance of said web past said cutting means; and a drive means linking said cutting means with such printing means for rotating said cutting roll once for each of a given number plus one-half revolutions of said gravure roll to cut said web transversely along the linear center of a line of said adhesive on said web during one revolution of said cutting roll and along the linear center of a space between said lines of adhesive on a succeeding revolution of said cutting roll.

9. Apparatus for making a stack of unexpanded honeycomb core sheets from a continuous web comprising: a printing means for applying transversely extending lines of adhesive at linearly spaced intervals along the length and on one side of a web of material moving through said printing means including: a rotably driven gravure roll having an odd number of transversely extending gravure lines equally space around the circumference of said roll adapted to apply lines of adhesive on said web; and a rotably driven backup roll on the side of said web opposite said gravure roll for pressing said web against said gravure roll to assure adhesion of adhesive thereon from said gravure roll and for controlling the advance of said web between said rolls; a cutting means downstream from said printing means for cutting said web into discrete sheets of equal predetermined length, said cutting means including: a rotably driven cutting roll having a circumference equal to the desired length of the sheet to be cut from said web and having a cutting blade thereon adapted to co-act with a cutting anvil for cutting said web into discrete sheets, the rotation of said cutting roll being arranged to rotate once for a given number plus one-half revolutions of said gravure roll resulting in one cut being made along the linear center of a line of adhesive and the next succeeding cut being made along the linear center of a space between the said lines of adhesive whereby alternate sheets cut from said web have adhesive lines thereon spaced equally between the adhesive lines on the others of said sheets so that when said sheets are stacked evenly in edge relationship, said adhesive lines are evenly staggered between alternate sheets; and a driven gripping means between said printing means and said cutting means for pulling said web between said gravure roll and said backup roll and for guiding said web into said cutting means to achieve accurately cut lengths of said sheets.

10. The apparatus of claim 9 wherein the circumference of said gravure roll is an even number of inches and the circumference of said cutting roll is an odd number of inches, said rolls being arranged so that a given number plus one-half revolutions of said gravure roll will equal one revolution of said cutting roll thereby producing said discrete sheets in inch lengths of odd number.

11. The apparatus of claim 10 further including a pair of linearly spaced idler rolls located ahead of said printing means for applying tension to and guiding said web into said printing means.

12. The apparatus of claim 11 further including an idler roll between said backup roll and said gripping means for guiding said vacuum pulling means.

13. The apparatus of claim 12 wherein said gripping means includes: a pair of linearly spaced rolls encircled by an endless belt having perforations therein; a vacuum box between a top flight of said belt for applying vacuum through said perforations for holding said web to the top surface of said belt to control the advance of said web into said cutting means to achieve accurate cutting of said web into discrete sheets of equal lengths; and a vacuum means for applying vacuum pump to said vacuum box.

14. The apparatus of claim 13 wherein said gripping means includes: a pair of pinch rolls downstream from said idler roll between which said web is guided towards said cutting means, said pinch rolls being driven at a surface speed equal to the desired speed of advance of said web.

15. The apparatus of claim 14 where said cutting anvil is fixed to a frame member of said apparatus, said cutting blade on said cutting roll adapted to shear said web passing between said cutting blade and said fixed anvil.

16. The apparatus of claim 15 further including a doctor blade adapted to wipe adhesive from the surface of said gravure roll prior to said surface coming in contact with said web for leaving adhesive only in said transversely extending gravure lines for application onto said web.

17. The apparatus of claim 15 further including hopper means substantially beneath said cutting means and having at least one upstanding end to halt the advance of said discrete sheets cut by said cutting means to form a stack of said discrete sheets in even edge alignment.

18. The apparatus of claim 17 further including a vibrator means operatively connected to said hopper means for vibrating said hopper means to cause said sheets to settle against a downstream end of said hopper means thereby ensuring even edge alignment of said sheets in said hopper means.

19. The apparatus of claim 9 further including: a first idler roll between said backup roll and said gripping means; said vacuum pulling means including a pair of linearly spaced rolls encircled by an endless perforated belt having vacuum applied through said perforations to hold said web by vacuum pressure onto said belt for advancement therewith; a second idler roll of smaller diameter than said rolls in said vacuum pulling means and spaced there between; and a gear connected for driven rotation on the end of each of said gravure roll, said backup roll, said first idler roll, said rolls of said vacuum pulling means, said second idler roll, and said cutting roll. The diameter of each of said rolls, except said cutting roll and said second idler rolls being of substantially equal diameter and the pitch diameter of each of said gears for all of said rolls, except said cutting roll, being substantially equal to the pitch diameter of said gravure roll, all of said gears being in mesh for given rotation by a drive means connected to one of said rolls for rotating a gear of said cutting roll a given number plus one-half revolutions of said gravure roll.

20. The apparatus of claim 9 wherein said cutting means includes: a support means for said cutting blade; and rotatable mounting means for said support means, said support means being adapted for adjustment relative to said mounting means to position said cutting blade at a selected distance from said rotatable mounting means to provide a selected cutting circumference for said cutting blade whereby the length of said sheets cut from said web may be selectively varied, said rotatable mounting means being adapted for connection to said printing means to rotate said gravure roll whereby alternate cuts across the width of said web occur along the linear center of said lines of adhesive and the others of said cuts occur along the linear center of said spaces between said lines of adhesive.

* * * * *